Sept. 30, 1958     H. J. EVANS     2,853,894
PIVOT CONNECTION
Filed Aug. 27, 1953
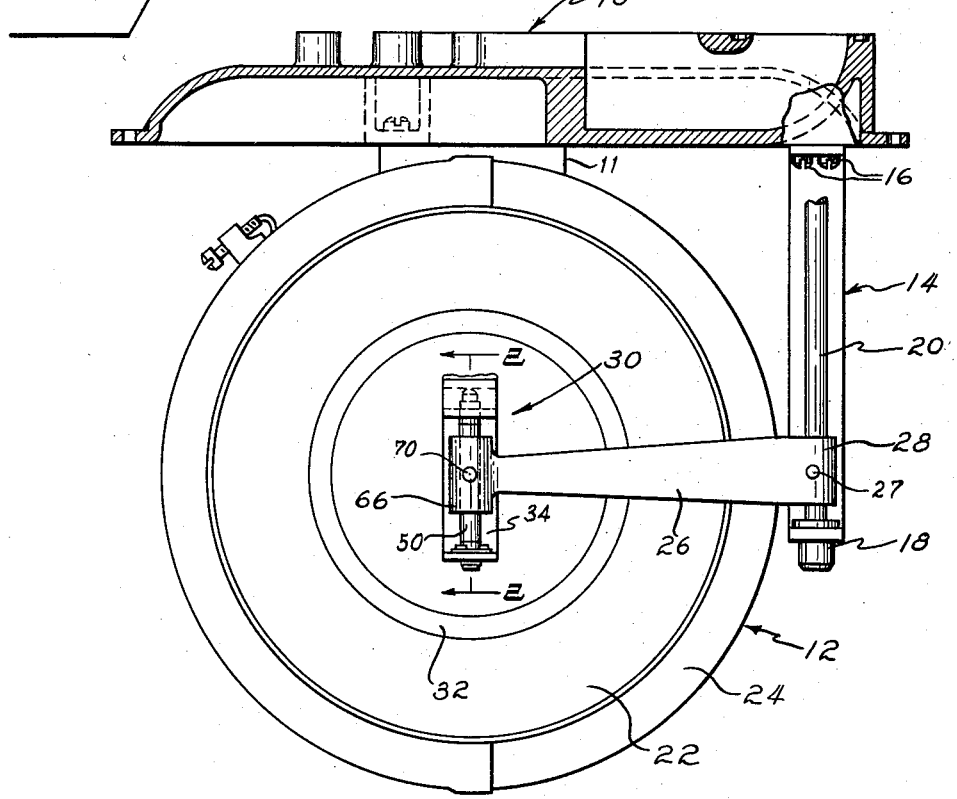
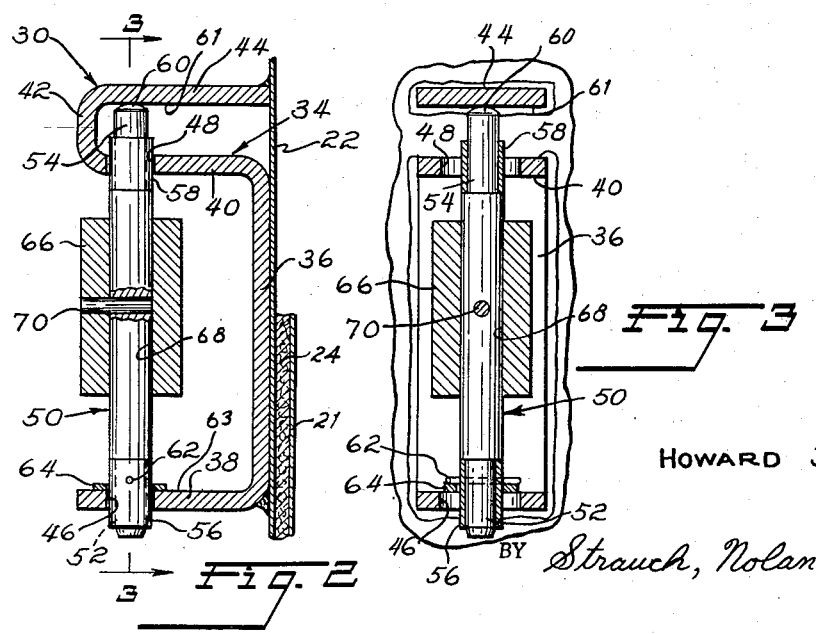
INVENTOR
HOWARD J. EVANS
BY Strauch, Nolan & Diggins
ATTORNEYS

United States Patent Office 2,853,894
Patented Sept. 30, 1958

2,853,894

PIVOT CONNECTION

Howard J. Evans, Pittsburgh, Pa., assignor to Rockwell Manufacturing Company, Pittsburgh, Pa., a corporation of Pennsylvania Application August 27, 1953, Serial No. 376,862

16 Claims. (Cl. 74—469)

The present invention relates to pivot connections and more particularly to special trunnion pin and supporting bracket construction.

The invention will be described in its preferred embodiment as the pivotal connection between the movable wall of a gas meter bellows and a crank arm on the flag rod, as for use in the gas meter disclosed in United States Patent No. 2,544,665, issued to E. R. Gilmore, March 31, 1951. In prior gas meters such as that disclosed in the Gilmore patent, wear difficulties had to be overcome in the bearing surfaces of this connection because in addition to serving as a radial bearing the pivot must function as a thrust bearing chiefly supporting the weight of the movable wall of the bellows. The movable wall of the bellows is conventionally a flexible annulus of oiled sheepskin bound about its outer periphery to the rigidly mounted pan of the bellows and having its inner periphery clamped between circular metal plates, and the mounting bracket for the pivot is secured to the outer of these clamp plates, so that the weight of the clamp plates and at least part of the flexible annulus must be carried by the pivotal connection to center the bellows with the pan and prevent sagging.

In the preferred embodiment of the invention I have provided a combined radial and thrust bearing connection of simplified but efficient construction which contains fewer parts, is easier to manufacture and assemble and results in a more rigid and rugged construction which improves the operation and overall accuracy of the entire meter. More specifically it includes a special mounting bracket and associated trunnion pin as will hereinafter appear.

It will be understood, however, that although its assembly with the gas meter parts constitutes one phase, the invention is not entirely so limited but may find utility in diverse mechanical linkages wherein similar problems are encountered.

The major object of the invention is to provide a novel radial and thrust bearing pivot connection.

A further object of the invention is to provide a novel radial and thrust bearing connection between the movable bellows wall and the flag rod in a gas meter.

Another object of the invention is the provision of a special bracket and trunnion pin assembly in which the bracket comprises a unitary member providing both radial and thrust bearing for the pin.

Another object of the invention is the provision of a novel pivot bracket which is readily and inexpensively fabricated by conventional machines from a single strip of flat stock.

A further object is the provision of a one-piece pivot bracket which is secured to its supporting member by welding or brazing.

A further object is the provision of an improved trunnion bracket and pin assembly for connecting the clamp plate of a bellows in a bellows type gas meter to the flag rods thereof, whereby the weight of the clamp plate is freely movably supported.

A still further object is the provision of an improved trunnion bracket and trunnion pin assembly in which the pin is removably held in position by a simple retainer.

These and other objects and the advantages of the invention will be apparent to those skilled in the art from a reading of the following description and subjoined claims in conjunction with the annexed drawings, in which:

Figure 1 is a fragmentary side elevation partly in section of the valve plate and diaphragm assembly of a gas meter embodying the preferred form of the invention;

Figure 2 is an enlarged section on line 2—2 of Figure 1, showing the bracket and trunnion pin assembly; and Figure 3 is a section on line 3—3 of Figure 2 with the trunnion pin shown in elevation.

A valve plate 10 of a gas meter is suitably rigidly mounted in the meter. A diaphragm assembly 12 is secured to the bottom of valve plate 10, the diaphragm pan (not shown) being suspended from plate 10 as by neck 11. A flag rod bracket 14 is also suspended from the bottom of valve plate 10, as by screws 16. Flag rod bracket 14 is substantially U-shaped with its top leg secured to plate 10 by screws 16, and its bottom leg contains a socket bushing 18 for rotatably seating the lower end of a flag rod 20. Flag rod 20 is connected above plate 10 to a mechanical linkage operatively coupling it with the usual control valves (not shown).

Diaphragm assembly 12 includes circular clamp plates 21 and 22 secured to the center of an annular oiled sheepskin diaphragm 24. Due to the flexibility of the diaphragm, clamp plates 21 and 22 are capable of and, in the normal operation of the meter, undergo a linear reciprocating motion along a horizontal axis normal to their planes. This reciprocation is transmitted to and results in oscillation about its own axis of flag rod 20 by means of a horizontal connecting arm 26 having an apertured boss 28 at one end surrounding flag rod 20 and fixed to it as by fastener element 27. The opposite end of arm 26 is connected to outer clamp plate 22 by the bracket and trunnion pin assembly 30 described below.

At substantially mid-radius, outer clamp plate 22 is provided with an annular reinforcing embossment 32 which increases the rigidity of the plate. Substantially at the center of plate 22, a trunnion bracket 34 is secured. As shown in Figure 2, bracket 34 is a reversely curved metal member made from a single length of flat stock consisting of an outwardly open U-shaped channel portion having a relatively wide straight web 36 and parallel side walls 38 and 40 and an inwardly open U-shaped channel portion having a relatively narrow straight web 42, a side wall 40 common with the wide channel, and a parallel side wall 44. Walls 38, 40 and 44 are all parallel, normal to plate 22 in the assembly and preferably of the same length.

Bracket 34 is permanently secured to plate 22, preferably by welding or brazing web 36 and the free edge of side wall 44 thereto as shown in Figure 2. The ends of the side wall 38 and 40 remote from web 36 are provided with aligned parallel sided slots 46 and 48 having their long axes parallel to web 36 and adapted to rotatably receive a trunnion pin 50. The ends of pin 50 are preferably reduced as at 52 and 54 to receive press-fitted bearing sleeves 56 and 58 having an outside diameter preferably equal to the intermediate section of pin 50 and adapted to be freely slidably and rotatably received in slots 46 and 48 respectively. The outer diameters of sleeves 56 and 58 is just enough less than the width of the associated slots to provide this relation without rattling. Beyond sleeve 58, the reduced upper end 54 of pin 50 which is journalled in common wall 40 is provided with a spheroidal tip 60 which abuts the inner flat surface 61 of side wall 44 to provide a substantially point contact thrust bearing in one direction for the pin. A cotter pin 62 or like fastener extends through a suitable diametral bore in sleeve 56 and lower reduced pin end 52 and projects from both sides of the trunnion pin to bear on the upper surface of a thrust washer 64 loosely interposed between it and the inner flat surface 63 of side wall 38 to provide a thrust bearing for pin 50 in the opposite direction.

The end of arm 26 remote from the flag rod 20 is formed with a boss 66 containing a through bore 68 snugly receiving the midportion of trunnion pin 50 and non-rotatably secured thereto as by a radial locking pin 70. Preferably the axis of pin 70 is about central with plate 22.

In the normal operation of the meter, as the bellows opens and closes the movable parts of the diaphragm assembly reciprocate substantially horizontally linearly while the associated end of arm 26 oscillates in an arcuate horizontal path having flag rod 20 as its center. Arm 26 thus holds trunnion pin 50 fixed against vertical displacement. The ends of pin 50 slide back and forth in slots 46 and 48 to compensate for the diversity in paths of motion of the arm and clamp plates. Furthermore, the clamp plates are free to pivot about trunnion pin 50 so that an extremely flexible but structurally simple lost motion connection is achieved which permits and compensates for substantial amounts of misalignment and requires no close manufacturing tolerances and which is not affected by the weight of the pivoted diaphragm parts. The effective weight of the clamp plates and part of the annulus 24 is entirely carried on thrust bearing 60 with minimum friction and without interfering with pivotal movement of pin 50. Sleeves 56 and 58 provide radial bearing for trunnion pin 50, and the direction of slots 46 and 48 relative to the path of arm 26 prevents relative tilting of trunnion pin 50 in bracket 34. Cotter pin 62 and washer 64 may provide a supplemental thrust bearing but primarily they merely held the parts in assembly.

The valves, general bellows structure, casing and other gas meter parts not specifically described above may be the same as the corresponding parts in said Gilmore patent to which reference is made for such further detail if any as may be necessary to understand the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a member adapted to move back and forth in a substantially linear horizontal path, an arm oscillatable about an axis normal to said path, a vertical trunnion pin fixed against axial displacement on said arm remote from said axis and having an arcuate bearing surface at its upper end, means rigid with said member extending into thrust bearing engagement with said bearing surface so that the weight of said member is essentially carried by said bearing surface, and other means rigid with said member having radial slide bearing engagement with said trunnion below and independent of said thrust bearing surface.

2. In a gas meter of the type characterized by a bellows wall linearly reciprocable in a horizontal axis, a flag rod journalled for rocking on a vertical axis, and a crank arm fixed to said flag rod and projecting radially therefrom the improvement which comprises the provision of a vertical trunnion pin rigid with said crank arm and having a thrust bearing surface on its upper end, a bracket rigid with said bellows wall having aligned apertures providing a radial slide bearing between said pin and bracket, and coacting means on said bracket and said bearing surface on the upper end of said trunnion pin defining an independent thrust bearing for carrying at least part of the weight of said movable bellows wall.

3. In the gas meter or the like defined in claim 2, said aligned apertures being slots in the bracket extending in a direction substantially normal to the direction of reciprocation of the bellows wall to provide a lost motion connection.

4. In combination, a trunnion bracket comprising a pair of oppositely facing U-shaped channels integrally joined by a common sidewall and having webs extending in opposite directions, a pair of aligned elongated apertures in the side walls of one of said channels, and a trunnion pin having spaced portions journalled in said apertures and an end in thrust bearing contact with the remaining channel side wall.

5. In combination, a reciprocable member, a swingable member, a trunnion pin mounted on said swingable member with its axis parallel to the axis of swing, and means supporting and pivoting said reciprocable member on said pin comprising spaced arms projecting from said reciprocable member slidably and rotatably connected to said pin and another arm rigidly projecting from said reciprocable member having a step bearing connection with the top of said pin.

6. In the combination defined in claim 5, said swingable member being fixed to said trunnion pin between said spaced arms.

7. In the combination defined in claim 5, said arms being integral sections of a bracket formed of a single length of stock.

8. In a gas meter of the type characterized by a rockably mounted valve control rod, a bellows assembly having a reciprocating end wall movable in a path normal to the axis of rotation of said rod and an elongated arm fixed to said rod and extending into such connection with the said bellows assembly as to convert reciprocation of said end wall into rocking movement of said flag rod, the improvement which comprises the provision in said connection of a bracket rigid with said bellows end wall comprising a pair of oppositely facing U-shaped channels integrally united by one common side wall and having webs extending in mutually opposite directions from opposite edges of said common side wall and a pair of axially aligned elongated apertures in the side walls of one of said channels extending transversely to the direction of reciprocation of said end wall, and a trunnion pin non-rotatably secured intermediate its ends to said elongated arm and having opposite ends slidably and rotatably disposed in said apertures, one of said ends extending through the respective aperture and having a rounded end surface in thrust bearing contact with the inner surface of the separate side wall of the other of said channels.

9. A trunnion bracket comprising a rigid member formed to provide two oppositely open channels having a common side wall, the side walls of one of said channels having parallel aligned slide pivot slots.

10. In a vertical pivot construction of the type characterized by the connection of a reciprocable member to a pivoted member for translating movement of one into movement of the other, that improvement in the connection which comprises a bracket rigid with one member and a trunnion rigid with the other member, said bracket being formed with at least three spaced parts projecting away from said one member, the lower two of said parts being formed with aligned openings in which said trunnion is slidably and rotatably mounted and the other of said parts engaging the top of said trunnion to provide an independent thrust bearing whereby the effect of weight of said one member borne by said pivot construction is minimized with respect to the motion transmitting function of said pivot construction.

11. In the pivot construction defined in claim 10, bearing sleeves on said trunnion within said openings.

12. In the pivot construction defined in claim 10, said openings comprising parallel slots disposed normal to the direction of reciprocation of said reciprocable member.

13. In a gas meter of the type characterized by a bellows end wall linearly reciprocable on a horizontal axis, a flag rod rockable on a vertical axis and having its lower end rotatably seated in a socket bearing on the meter, and a crank arm fixed to said flag rod and projecting radially therefrom, the improvement which comprises a vertical trunnion pin carried by said crank arm and having an upper end thrust bearing surface, and a bracket rigid with the bellows end wall having a radial slide bearing connection with said trunnion pin and being in thrust and slidable bearing engagement with said thrust bearing surface on said trunnion pin above said slide bearing connection, and the connection of the crank arm to the flag rod being adjacent and just above said socket bearing.

14. In a vertical pivot construction of the type characterized by the connection of a reciprocable member to a oscillatable member for translating to movement of one into movement of the other, that improvement in the connection which comprises a bracket rigid with one member and a trunnion pin mounted on the other, means on said trunnion pin providing a top thrust bearing surface, and means on said bracket providing parallel upper and lower slots for slide pivot bearing engagement with the sides of said trunnion pin and also providing a thrust bearing surface spaced above and adjacent the upper slot to form a coacting slide thrust bearing surface for the upper end of said trunnion pin.

15. A gas meter trunnion bracket comprising a rigid U-shaped portion provided with parallel upper and lower arms, means on said arms providing parallel aligned slide slots for a trunnion pin, and means rigid with said bracket disposed above and spaced from the slot in the upper arm providing a thrust bearing face slidably engaging the upper end of said trunnion pin regardless of the position of said trunnion pin along said slots.

16. The gas meter trunnion bracket defined in claim 15, wherein said arms are integrally connected by a flat vertical web disposed at right angles to said arms and said slots have their long dimensions substantially parallel to said web.

References Cited in the file of this patent
UNITED STATES PATENTS

| | | |
|---|---|---|
| 489,080 | Koontz | Jan. 3, 1893 |
| 625,546 | Fawell | May 23, 1899 |
| 2,544,665 | Gilmore | Mar. 13, 1951 |